US009248409B2

(12) United States Patent
Noh et al.

(10) Patent No.: US 9,248,409 B2
(45) Date of Patent: Feb. 2, 2016

(54) HOLLOW-FIBRE MEMBRANE MODULE

(75) Inventors: Soo-Hong Noh, Seoul (KR); Oh-Sung Kwon, Seoul (KR); Young-Keun Choi, Gangwon-do (KR); Chan-Sik Kim, Gangwon-do (KR); Seung-Il Lee, Gyeonggi-do (KR); Woo-Seung Choi, Gangwon-do (KR)

(73) Assignee: Woongjin Coway, Co. Ltd. (KR)

( * ) Notice: Subject to any disclaimer, the term of this patent is extended or adjusted under 35 U.S.C. 154(b) by 558 days.

(21) Appl. No.: 13/575,362

(22) PCT Filed: Jan. 27, 2011

(86) PCT No.: PCT/KR2011/000567
§ 371 (c)(1),
(2), (4) Date: Jul. 26, 2012

(87) PCT Pub. No.: WO2011/093652
PCT Pub. Date: Aug. 4, 2011

(65) Prior Publication Data
US 2012/0292248 A1 Nov. 22, 2012

(30) Foreign Application Priority Data

Jan. 28, 2010 (KR) .................. 10-2010-0007720

(51) Int. Cl.
*B01D 69/08* (2006.01)
*B01D 63/02* (2006.01)
(Continued)

(52) U.S. Cl.
CPC ............... *B01D 63/04* (2013.01); *B01D 61/18* (2013.01); *B01D 63/024* (2013.01); *B01D 65/02* (2013.01); *B01D 65/10* (2013.01); *C02F 1/444* (2013.01); *B01D 2313/08* (2013.01); *B01D 2313/10* (2013.01); *B01D 2313/12* (2013.01); *B01D 2313/16* (2013.01); *B01D 2313/18* (2013.01); *B01D 2313/20* (2013.01); *B01D 2313/26* (2013.01); *B01D 2321/185* (2013.01)

(58) Field of Classification Search
CPC ....................................................... B01D 63/04
See application file for complete search history.

(56) References Cited

U.S. PATENT DOCUMENTS 4,124,510 A * 11/1978 Joh ............................ 210/321.8
4,476,015 A * 10/1984 Schmitt et al. .................. 210/93
(Continued)

FOREIGN PATENT DOCUMENTS

CN         101422699 A    5/2009
JP          07000770 A    1/1995
(Continued)

OTHER PUBLICATIONS

International Search Report for Application No. PCT/KR2011/000567 dated Oct. 28, 2011.
(Continued)

*Primary Examiner* — Krishnan S Menon
*Assistant Examiner* — Bradley R Spies
(74) *Attorney, Agent, or Firm* — Lerner, David, Littenberg, Krumholz & Mentlik, LLP

(57) ABSTRACT

Provided is a hollow-fiber membrane module comprising a submodule inside which raw water is circulated and water treatment is carried out, and a piping unit which is connected to the submodule and through which the raw water and air and treated water flow, such that flow rates can be increased and energy consumption can be minimized through the circulation of a fluid.

19 Claims, 14 Drawing Sheets

(51) Int. Cl.
*B01D 63/04* (2006.01)
*B01D 65/10* (2006.01)
*B01D 65/02* (2006.01)
*B01D 61/18* (2006.01)
*C02F 1/44* (2006.01)

(56) References Cited

U.S. PATENT DOCUMENTS

| | | | | |
|---|---|---|---|---|
| 6,126,819 | A * | 10/2000 | Heine et al. | 210/139 |
| 6,331,248 | B1 * | 12/2001 | Taniguchi et al. | 210/321.8 |
| 6,471,869 | B1 | 10/2002 | Yanou et al. | |
| 7,347,937 | B1 * | 3/2008 | Cheng et al. | 210/497.1 |
| 2002/0162455 | A1 | 11/2002 | Bikson et al. | |
| 2003/0038075 | A1 * | 2/2003 | Akimoto et al. | 210/321.79 |
| 2004/0035779 | A1 * | 2/2004 | Vossenkaul et al. | 210/321.6 |
| 2007/0056893 | A1 | 3/2007 | Noh et al. | |
| 2009/0308797 | A1 | 12/2009 | Noh et al. | |

FOREIGN PATENT DOCUMENTS

| | | |
|---|---|---|
| JP | 11128695 A | 5/1999 |
| KR | 20-0340528 Y1 | 2/2004 |
| KR | 100535301 B1 | 12/2005 |
| WO | 2007022576 A1 | 3/2007 |

OTHER PUBLICATIONS

Extended European Search Report for Application No. 11737291.2 dated Aug. 5, 2014.

* cited by examiner

HOLLOW-FIBRE MEMBRANE MODULE

CROSS REFERENCE TO RELATED APPLICATIONS

The present application is a national phase entry under 35 U.S.C. §371 of International Application No. PCT/KR2011/000567, filed Jan. 27, 2011, published in Korean, which claims priority from Korean Patent Application No. 10-2010-0007720, filed Jan. 28, 2010, all of which are incorporated herein by reference.

TECHNICAL FIELD

The present invention relates to a hollow fiber membrane module. More particularly, the present invention relates to a hollow fiber membrane module which can be convertibly used in various operation modes.

BACKGROUND ART

In general, a water treatment system using membranes is classified as an vacuum type system which soaks a membrane module in water to be treated and applies negative pressure to suction and filter the water or an external pressure type system which forcibly sends water to be treated to a casing filled with membranes.

The vacuum type system has advantages in that the system is simple, and treatment of a high-concentration, high-viscosity solution is easy, whereby pre-treatment processes, such as cohesion and precipitation, are unnecessary. Also, in a case in which the membranes are soaked so that the operation is performed as the vacuum type system, it is possible to completely remove particle materials from the finally treated water by the membranes and, in addition, to maintain the concentration of high-concentration microorganisms in a reaction vessel. Consequently, it is possible to obtain a higher contaminant decomposition effect through microorganisms than in an active sludge method.

However, the vacuum type system requires a reaction vessel to soak the membrane module. Also, the vacuum type system has a structurally limited space, and therefore, it is necessary to increase the size of the reaction vessel in increasing the size of the system due to enlargement of the system.

That is, in a real process to which the vacuum type membrane system is applied, the size of the initially designed reaction vessel is fixed. For this reason, when it is necessary to increase treatment capacity due to the increase of the amount of necessary treatment, construction of another reaction vessel is inevitable.

On the other hand, in the case of the external pressure type system, a membrane module is installed to filter water to be treated without a reaction vessel. This system has advantages in that, when a consumer needs greater treatment capacity, such a need is satisfied only by further installing a membrane module in an open space in addition to the reaction vessel. Consequently, it is possible to increase the size of the external pressure type system.

However, the external pressure type system has problems in that pre-treatment is necessary, and an amount of circulation necessary to maintain superficial flow velocity of the membranes is so large as to increase the size of a pump, whereby energy efficiency is lowered.

TECHNICAL PROBLEM

Therefore, it is an object of the present invention to provide a hollow fiber membrane module that is capable of increasing flow velocity through circulation of a fluid while minimizing energy consumption.

Also, it is another object of the present invention to provide a hollow fiber membrane module that can have advantages of an vacuum type system and an external pressure type system in a composite fashion and can be applied to the vacuum type system or the external pressure type system.

Also, it is another object of the present invention to provide a hollow fiber membrane module that is capable of enabling easy extension of a facility.

Also, it is another object of the present invention to provide a hollow fiber membrane module that is capable of minimizing contamination of hollow fiber membranes.

Also, it is a further object of the present invention to provide a hollow fiber membrane module that is capable of simplifying facility construction and minimizing maintenance costs.

TECHNICAL SOLUTION

In accordance with an aspect of the present invention, the above and other objects can be accomplished by the provision of a hollow fiber membrane module including a submodule in which raw water is circulated and water treatment is carried out and a piping unit which is connected to the submodule and through which raw water, air, and treated water flow.

The hollow fiber membrane module may further include a discharge port provided at an upper part of the submodule, wherein the hollow fiber membrane module may be operated as an vacuum type module or an external pressure type module depending upon an opening and closing degree of the discharge port.

The submodule may include a housing forming an external appearance thereof, the housing being provided at one side thereof with a raw water inlet port, through which raw water is introduced, an air inlet port, through which air is introduced, and an outlet port, through which treated water is discharged, at least one partition wall installed in the housing to partition an interior of the housing into a water treatment region and a raw water circulation passage, the partition wall being provided at opposite ends thereof with holes, through which raw water flows, a hollow fiber membrane disposed in the water treatment region to carry out water treatment using pressure difference, a fixing part to fix the hollow fiber membrane to the housing, a collector communicating with an internal passage of the hollow fiber membrane to collect treated water having passed through the hollow fiber membrane, the collector communicating with the outlet port, an air diffusion pipe communicating with the air inlet port of the housing to spray air bubbles to the hollow fiber membrane, and a raw water passage communicating with the raw water inlet port and connected to the raw water circulation passage to supply raw water.

The partition wall may be installed at one end of the housing so that the raw water circulation passage is formed at the one end of the housing.

The partition wall may be installed at each end of the housing so that the raw water circulation passage is formed at each end of the housing.

The partition wall may be installed so as to surround a central part of the housing.

The area of the raw water circulation passage partitioned by the partition wall may be ⅓ or more that of the water treatment region.

The housing may discharge condensed water containing condensed contaminants or air through a discharge port formed at the upper part thereof.

The air diffusion pipe may include a middle passage formed in the housing and communicating with the air inlet port, a side air diffusion plate communicating with the middle passage, installed along an inside of the water treatment region of the housing, and having an air diffusion hole to spray air, a middle air diffusion plate communicating with the middle passage, disposed at a middle of the water treatment region of the housing, and having an air diffusion hole to spray air, and an auxiliary air diffusion plate communicating with the middle passage, disposed between the side air diffusion plate and the middle air diffusion plate, and having an air diffusion hole to spray air.

The housing may be provided at an inside thereof with a guide plate protruding toward the hole formed at the lower end of the partition wall to guide raw water to the water treatment region through the hole.

The housing may further include a middle partition wall installed in the water treatment region between the partition wall and an inner wall of the housing such that the middle partition wall extends in a longitudinal direction of the hollow fiber membrane.

The piping unit may include a raw water pipe having a raw water connection port, through which raw water is supplied, formed at a side thereof, the raw water pipe being connected to the raw water inlet port of the submodule, an air pipe having an air connection port, through which air is supplied, formed at a side thereof, the air pipe being connected to the air inlet port of the submodule, and a water collection pipe having a treated water connection port, through which treated water is introduced, formed at a side thereof, the water collection pipe being connected to the outlet port of the submodule.

Also, the piping unit may further include a water discharge pipe, through which condensed water is discharged from the submodule.

The piping unit may be located at a central part of the submodule, and the submodule may include a plurality of submodules disposed along an outer circumference of the piping unit.

To this end, the piping unit may be configured to have a multiple pipe structure in which the air pipe is disposed in the raw water pipe and the water collection pipe is disposed in the air pipe.

Also, the water discharge pipe may be disposed in the water collection pipe.

The raw water connection port may be formed at an upper end of the raw water pipe of the piping unit along an outer circumference thereof, the air connection port may be formed at an upper end of the air pipe, extending to the upper end of the raw water pipe, along an outer circumference thereof, and the treated water connection port may be formed at an upper end of the water collection pipe, extending to the upper end of the air pipe, along an outer circumference thereof, so that the submodules are installed along the outer circumference of the piping unit via the connection ports.

The hollow fiber membrane module may further include a module support installed outside the piping unit to support the submodule.

The piping unit may extend in a straight line, and the submodule may include a plurality of submodules successively disposed in a longitudinal direction of the piping unit.

The raw water pipe, the air pipe, and the water collection pipe of the piping unit may be disposed in parallel at intervals, and raw water connection ports, air connection ports, and treated water connection ports may be respectively formed at the raw water pipe, the air pipe, and the water collection pipe at intervals in longitudinal directions thereof, so that the submodules are connected to each other in the longitudinal direction of the piping unit via the connection ports.

The module support may be further installed outside the piping unit to support the submodule.

ADVANTAGEOUS EFFECTS

According to the present invention as described above, each of the submodules includes a reaction vessel to store raw water and independently circulate the raw water, and therefore, an additional reaction vessel to soak each of the submodules is unnecessary.

Also, the membranes are soaked in raw water, thereby obtaining an advantage of an vacuum type system. Furthermore, the system can be operated in a state in which the module is not soaked in the reaction vessel, thereby also obtaining an advantage of an external pressure type membrane filtration system.

Also, in a case in which the module is operated in a state in which the upper part of the module is exposed to the atmosphere, the module can be operated as an vacuum type membrane filtration system to produce treated water using suction force. Furthermore, in a case in which an opening and closing degree of the discharge port is adjusted to restrict the discharge of air introduced into the submodule by air diffusion, raw water is pressurized, and therefore, the module can be operated as an external pressure type module.

Also, a conventional external pressure type module is operated only in a mode to control contamination at the surfaces of the membranes using flow velocity of a fluid flowing in the horizontal direction with respect to the surfaces of the membranes as a cross flow filtration mode. On the other hand, the present module can control contamination through air diffusion even in a case in which the present module is used as an external pressure type module.

Also, upward flow of air due to air diffusion generates fluid circulation flow between a membrane filling part and a raw water flow space in the module, and therefore, it is possible to reduce energy consumption as compared with a real external pressure type module which generates circulation flow using a pump.

Also, it is possible to increase fluid flow velocity passing the surfaces of the hollow fiber membranes through internal circulation by the partition wall, thereby minimizing membrane contamination.

Also, high flow velocity is achieved at low air flow rate, and therefore, it is possible to increase air diffusion efficiency and to reduce energy consumption due to air diffusion.

Also, treated water is collected at the lower end of the module and is sent along the pipe, and therefore, head pressure of the module can be used as filtration pressure during construction of the system. Consequently, it is possible to reduce energy consumption of an operation pump. Furthermore, air removal equipment to discharge air is unnecessary, and therefore, process simplification is possible.

Also, the respective modules are independently operated, and therefore, it is possible to prevent unbalanced flow of a fluid due to scale-up and to easily replace and maintain any defective module.

Also, the module has a compact structure, and therefore, it is possible to reduce consumption of a cleaning chemical when the hollow fiber membranes are cleaned. Consequently, it is possible to reduce chemical purchase costs and costs necessary for treating waste water produced as the result of cleaning.

DETAILED DESCRIPTION

Figure 1:
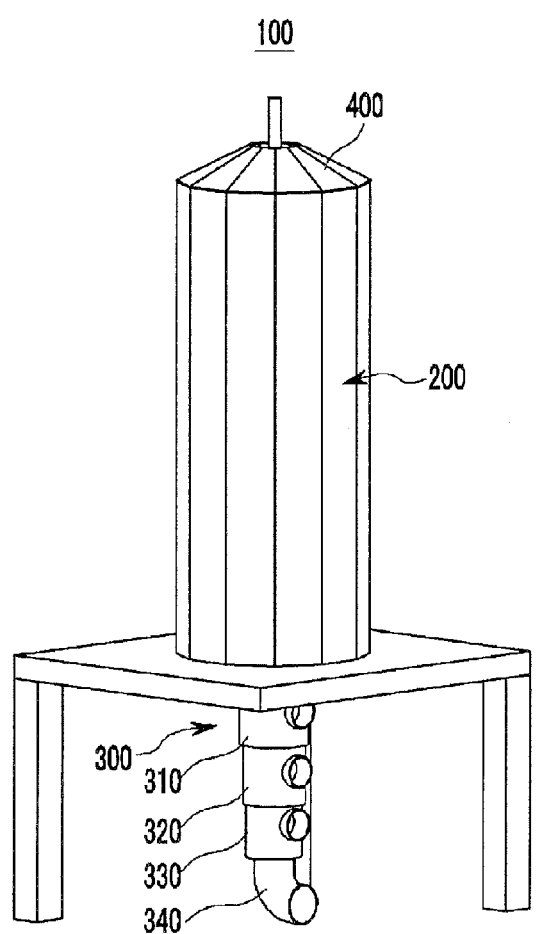
FIG. 1 is a perspective view showing a hollow fiber membrane module according to a first embodiment of the present invention.

Now, preferred embodiments of the present invention will be described in detail with reference to the accompanying drawings so that the present invention can be easily embodied by a person having ordinary skill in the art to which the present invention pertains. However, the present invention may be embodied in various different forms, and therefore, the present invention is not limited to the embodiments described in this specification.

It should be noted that the accompanying drawings are schematic and not based on a reduced scale. Relative dimensions and ratios of components constituting the present invention are exaggerated or understated in the accompanying drawings for the purpose of clarity and for the sake of convenience. Such dimensions are not restrictive but are merely illustrative. The same structures, elements, parts shown in two or more drawings are denoted by the same reference numerals, which are used to indicate characteristics corresponding to or similar to other embodiments.

The terminology used in this specification is for the purpose of describing particular embodiments only and is not intended to limit the present invention. As used in this specification, the singular forms are intended to include the plural forms as well, unless context clearly indicated otherwise. It will be further understood that the term "including," when used in this specification, specifies the presence of specific features, regions, integers, steps, operations, elements, and/or components, but does not preclude the presence or addition of other features, regions, integers, steps, operations, elements, components, and/or groups thereof.

Embodiments of the present invention described with reference to perspective views concretely indicate ideal embodiments of the present invention. As a result, various modifications of explanatory diagrams, such as modification of a manufacturing method and/or specification, are expected. Consequently, embodiments are not limited to specific forms of illustrated regions, and include, for example, modifications of forms according to manufacture. Regions shown in the accompanying drawings are merely rough. Also, forms of such regions are not intended to illustrate exact forms of the regions and are not intended to narrow the scope of the present invention.

First Embodiment

FIG. 1 shows the external appearance of a hollow fiber membrane module according to this embodiment.

A hollow fiber membrane module 100 includes a plurality of independent submodules 200 in which raw water is circulated and water treatment is carried out. The submodules 200 are connected to a piping unit 300 through which raw water, air, treated water, and condensed water flow. At the upper part of each of the submodules 200 is formed a discharge port 410 through which the condensed water and the air are discharged. An opening and closing degree of the discharge port 410 can be adjusted.

The hollow fiber membrane module is configured to be used as an vacuum type module or an external pressure type module depending upon a degree to which each of the submodules is hermetically sealed by a corresponding discharge port 410. The structure of the discharge port 410 is not particularly restricted so long as condensed water and air can be discharged through the discharge port, and the opening and closing degree of the discharge port can be adjusted.

Hereinafter, a structure in which the hollow fiber membrane module is operated as an external pressure type module by adjusting the opening and closing degree of the discharge port 410 provided at the upper part of each of the submodules 200 will be described as an example.

In this embodiment, the submodules 200 are arranged about the piping unit 300 along the outer circumference of the piping unit 300.

Figure 2:
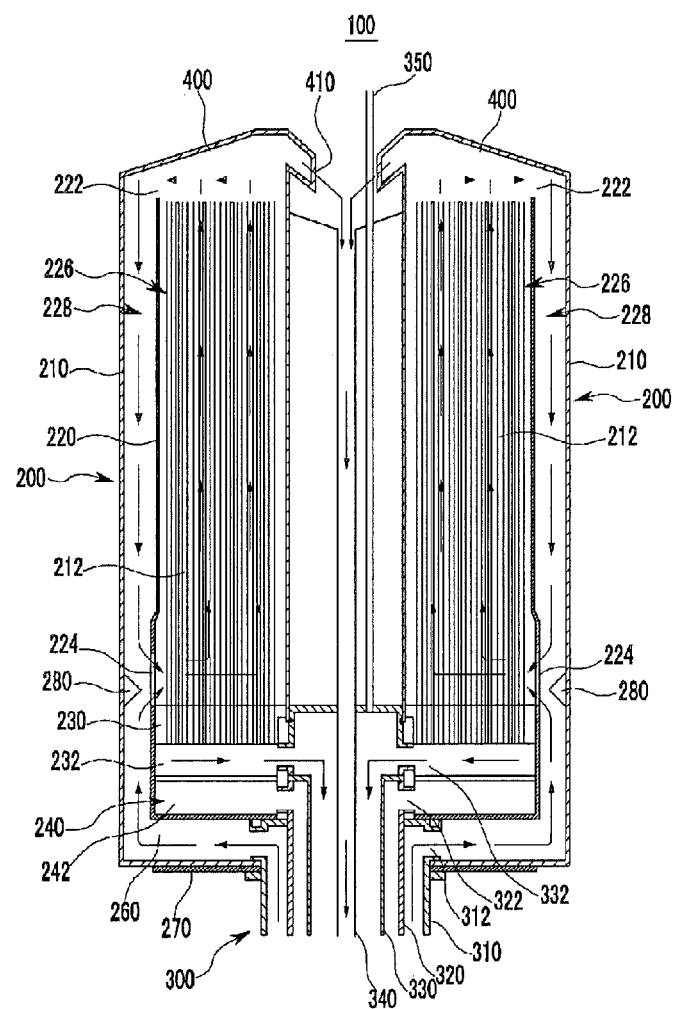
FIG. 2 is a side sectional view showing the hollow fiber membrane module according to the first embodiment of the present invention.
Figure 3:
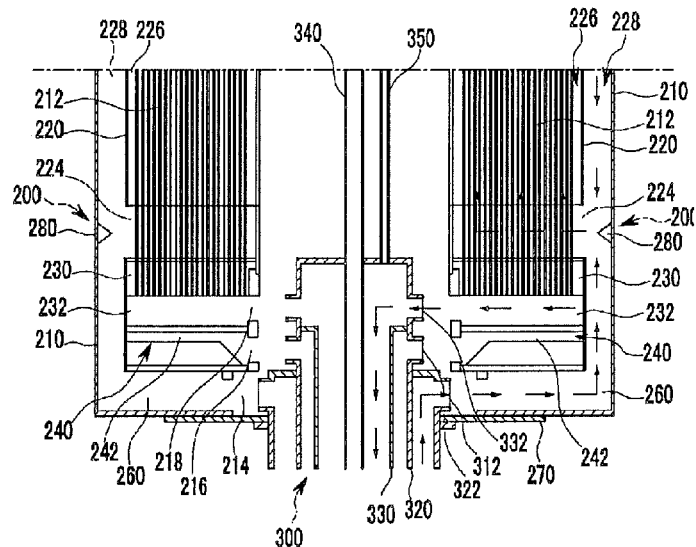
FIG. 3 is a sectional view showing the construction of the hollow fiber membrane module according to the first embodiment of the present invention in detail.

FIGS. 2 and 3 show the interior structures of the piping unit and the submodules according to this embodiment. Hereinafter, the structures of the piping unit and the submodules will be described with reference to the drawings.

1. Piping Unit

First, the piping unit 300, which is disposed at the center of the hollow fiber membrane module, will be described. The piping unit 300 includes a raw water pipe 310 having raw water connection ports 312, through which raw water is supplied, formed at the side thereof, the raw water pipe 310 being connected to the submodules 200, an air pipe 320 having air connection ports 322, through which air is supplied, formed at the side thereof, the air pipe 320 being connected to the submodules 200, and a water collection pipe 330 having treated water connection ports 332, through which treated water is introduced, formed at the side thereof, the water collection pipe 330 being connected to the submodules 200.

Also, the piping unit 300 further includes a water discharge pipe 340, through which condensed water is discharged from the submodules.

In this embodiment, the piping unit 300 is configured to have a multiple pipe structure. That is, the piping unit 300 may be configured to have a triple pipe structure in which the air pipe 320 is disposed in the raw water pipe 310 and the water collection pipe 330 is disposed in the air pipe 320. Alternatively, the water discharge pipe 340 may be disposed in the water collection pipe 330 so that the piping unit 300 may be configured to have a quadruple pipe structure. In this way, the piping unit may be configured to have a triple pipe structure in which three pipes are coupled or to have a quadruple pipe structure in which four pipes are coupled; however, the present invention is not particularly limited thereto.

The raw water pipe 310 is disposed vertically to constitute the outermost pipe. The raw water pipe 310 is provided along the outer circumference thereof with the raw water connection ports 312, which are arranged at regular intervals. The air pipe 320 has a smaller diameter than the raw water pipe 310. The air pipe 320 is spaced apart from the raw water pipe 310. The air pipe 320 is disposed in the raw water pipe 310 in the longitudinal direction and extends outside through the upper end and the lower end of the raw water pipe 310. The air pipe 320 extending through the upper end of the raw water pipe 310 is provided along the outer circumference of the upper end thereof with the air connection ports 322, which are arranged at regular intervals. The water collection pipe 330 has a smaller diameter than the air pipe 320. The water collection pipe 330 is spaced apart from the air pipe 320. The water collection pipe 330 is disposed in the air pipe 320 in the longitudinal direction and extends outside through the upper end and the lower end of the air pipe 320. The water collection pipe 330 extending through the upper end of the air pipe 320 is provided along the outer circumference of the upper end thereof with the treated water connection ports 332, which are arranged at regular intervals. The water discharge pipe 340, having a smaller diameter than the water collection pipe 330, is disposed in the water collection pipe 330 in the longitudinal direction such that the water discharge pipe 340 extends outside through the upper end and the lower end of the water collection pipe 330.

Also, an air injection pipe 350 to inject air into the water collection pipe 330 as needed is further connected to the upper end of the water collection pipe 330. In this embodiment, the air injection pipe 350 communicates with the upper end of the water collection pipe 330 and vertically extends to above the submodules 200. The air injection pipe 350 forcibly injects air to perform a pressure decay test (PDT) of hollow fiber membranes. In the present module, the air injection pipe 350 is connected to the water collection pipe 330 of the piping unit 300 such that the air injection pipe 350 communicates with the water collection pipe 330, and therefore, it is not necessary to install a conventional air removal system. That is, in a normal operation, the air injection pipe 350 remains blocked, and therefore, raw water and air are not discharged. In a case in which it is necessary to check whether the hollow fiber membranes are damaged, air of a predetermined pressure is injected into bores of the hollow fiber membranes through the air injection pipe 350 to perform a necessary test. In a conventional module, air is introduced through the water collection pipe 330 with the result that it is necessary to remove treated water from the entirety of the water collection pipe 330. Also, in the conventional module, it is necessary to further install an additional air removal system to remove air from the water collection pipe 330 after completion of a PDT.

In the present module, however, air is injected into the water collection pipe 330 through the air injection pipe 350 extending upward as described above, and therefore, it is not necessary to completely remove treated water from the air injection pipe 350. That is, it is possible to fill a portion of the upper part of a collector necessary for a PDT and the bores of the hollow fiber membranes with air even in a state in which the water collection pipe 330 is filled with treated water. After completion of the PDT, the air injected through the air injection pipe 350 is naturally discharged due to natural head.

Meanwhile, connection ports are provided at corresponding positions of the upper ends of the raw water pipe 310, the air pipe 320, and the water collection pipe 330. The submodules 200 are mounted along the outer circumference of the piping unit 300 via the connection ports.

Intervals at which the connection ports are arranged may be changed depending upon the size and number of the submodules 200 disposed along the outer circumference of the piping unit 300. In this embodiment, the connection ports may be arranged at intervals of 30 to 15 degrees along the outer circumference of each pipe such that 12 to 24 submodules 200 can be mounted along the outer circumference of the piping; however, the present invention is not particularly limited thereto.

2. Submodules

In this embodiment, the submodules 200 are mounted along the outer circumference of the piping unit 300. The submodules 200 serve as a reaction vessel to store raw water to be treated. Hollow fiber membranes 212 are provided in the submodules 200. In the submodules 200, raw water is circulated and water treatment is carried out. Each of the submodules 200 includes a housing 210, which forms the external appearance thereof and in which the hollow fiber membranes 212 are provided. The housing 210 is provided at one side thereof with a raw water inlet port 214, through which raw water is introduced, an air inlet port 216, through which air is introduced, and an outlet port 218, through which treated water is discharged. Also, the discharge port 410 to configure each of the submodules 200 as an vacuum type submodule or an external pressure type submodule is provided at the upper part of the housing 210 of each of the submodules 200. Hereinafter, each of the hollow fiber membranes 212 will be described, for example, as having an end-free structure in which one end of each of the hollow fiber membranes 212 is fixed while the other end of each of the hollow fiber membranes 212 is free; however, the present invention is not particularly limited thereto. For example, hollow fiber membranes configured to have various structures, such as a structure in which opposite ends of each of the hollow fiber membranes are fixed, may be applied to the present module in addition to the hollow fiber membranes each configured to have the end-free structure.

2-1. Housing

The housing 210 forms the external appearance of each of the submodules 200. The housing 210 may be formed of acryl or polyvinyl chloride (PVC); however, the present invention is not particularly limited thereto. The housing 210 is configured in a trapezoidal form having an angle of 15 to 30 degrees between opposite sides thereof. The housings 210 are disposed at the piping unit 300 in the radial direction. Consequently, the submodules 200 may be disposed along the outer circumference of the piping unit 300 in a state in which the housings 210 are in contact with each other at corresponding sides thereof.

In the housing 210 is vertically installed a partition wall 220 to partition the interior of the housing 210 into two regions. Hereinafter, the two regions partitioned by the partition wall 220 will be referred as a water treatment region 226 and a raw water circulation passage 228 for the convenience of description. At the upper end and the lower end of the partition wall 220 are formed an upper end hole 222 and a lower end hole 224, respectively, through which raw water flows. Raw water is circulated in the housing 210 of each of the submodules 200 by the partition wall 220 so that flow velocity of the raw water is increased. In an external pressure type structure using pressure generated in the housing 210 as discharge of air introduced due to air diffusion is restricted by adjusting the opening and closing degree of the discharge port 410, the flow velocity of the raw water is increased as described above, thereby improving a ratio of treatment efficiency to energy, which will be described in detail below.

The hollow fiber membranes 212, at which water treatment due to pressure difference is carried out, are provided in the water treatment region 226 of the housing 210. At the lower end of the housing 210 is provided a fixing part 230 to fix the hollow fiber membranes 212 to the housing 210. At the lower end of the fixing part 230 of the housing 210 is formed a collector 232 communicating with internal passages of the hollow fiber membranes 212 to collect treated water passing through the hollow fiber membranes. The collector 232 also communicates with the outlet port 218. At the lower part of the housing 210 is provided an air diffusion pipe 240 communicating with the air inlet port 216 to spray air bubbles to the hollow fiber membranes. At the lower part of the air diffusion pipe 240 is formed a raw water passage 260 communicating with the raw water inlet port 214 and connected to the raw water circulation passage 228 to supply raw water. The raw water passage 260 is a predetermined space provided at the lowermost end of the housing 210. The raw water passage 260 communicates with the lower end of the raw water circulation passage 228 at the inner wall of the housing 210.

Consequently, raw water, introduced into each of the submodules 200, is circulated between the water treatment region 226 and the raw water circulation passage 228 of the housing 210 so that the raw water is treated.

As shown, the outlet port 218, the air inlet port 216, and the raw water inlet port 214 are sequentially formed at the housing 210 in the downward direction. The outlet port 218, the air inlet port 216, and the raw water inlet port 214 are connected to the treated water connection ports 332, the air connection ports 322, and the raw water connection ports 312, respectively, so that treated water, air, and raw water can flow between the housing 210 and the piping unit 300.

A plurality of hollow fiber membranes 212 is arranged in the water treatment region 226 of the housing 210 in the longitudinal direction. At the lower end of the housing 210 are sequentially provided the hollow fiber membrane fixing part 230, the collector 232 communicating with the internal passages of the hollow fiber membranes, and the air diffusion pipe 240. The raw water passage 260 connected to the raw water inlet port 214 is formed at the lowermost end of the housing 210. The collector 232 and the air diffusion pipe 240 communicate with the treated water connection ports 332 and the air connection ports 322 of the piping unit 300 via the outlet port 218 and the air inlet port 216 formed at the housing 210, respectively. The raw water passage 260 is connected to the raw water connection ports 312 of the piping unit 300 via the raw water inlet port 214.

The submodules 200 are individually connected to the piping unit 300 as described above, and therefore, a specific one of the submodules 200 may be detached from the piping unit 300 as needed.

At the raw water inlet port 214, the air inlet port 216, and the outlet port 218 formed at the housing 210 and the respective connection ports formed at the piping unit 300 may be further provided airtightness maintenance means (not shown), such as packing members, to maintain airtightness at connection portions, thereby preventing leakage of treated water or air at the connection portions.

Reference numeral 270 indicates a lower module support to support the weight of the submodules 200 and to fix the submodules 200. The support 270 is formed in the shape of a disc. The support 270 may be separated from the piping unit 300. The structure of the support 270 is not particularly restricted so long as the support 270 can support the submodules 200.

2-2. Collector

The collector 232 is provided just under the hollow fiber membrane fixing part 230 of the housing 210. The collector 232 is a predetermined space communicating with the outlet port 218 of the housing 210. The collector 232 is connected to the water collection pipe 330 via the outlet port 218 and the treated water connection ports 332. Ends of the hollow fiber membranes fixed to the hollow fiber membrane fixing part 230 extend to the collector 232 so that the inner passages of the hollow fiber membranes communicate with the collector 232. That is, the hollow fiber membrane fixing part 230 to fix the hollow fiber membranes just above the collector is fixed to the inner wall of the housing 210.

In the present module, the collector 232 to collect treated water is provided at the lower end of the housing 210, and flow of the treated water is guided through the water collection pipe 330 of the piping unit 300 in the downward direction.

In this way, the treated water flows from the upper part to the lower part of the module, and therefore, head pressure of the module can be used as filtering pressure.

2-3. Air Diffusion Pipe

Figure 4:
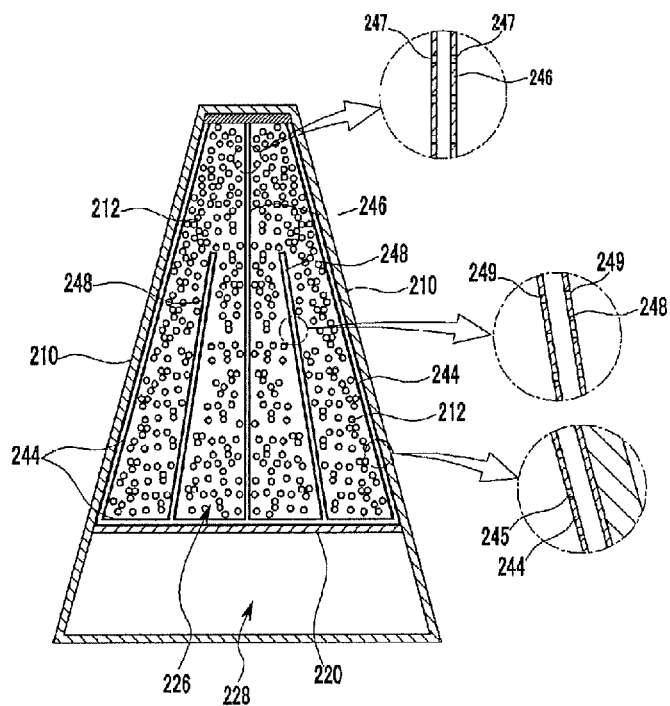
FIG. 4 is a schematic view showing an air diffusion structure of the hollow fiber membrane module according to the first embodiment of the present invention.

As shown in FIG. 4, the air diffusion pipe 240 includes a middle passage 242 provided at the lower end of the collector 232 of the housing 210 and communicating with the air pipe 320 via the air inlet port 216 and the treated water connection ports 332, side air diffusion plates 244 communicating with the middle passage 242, extending to above the fixing part 230 along the inner wall of the water treatment region 226 of the housing 210, and having air diffusion holes 245 to spray air, a middle air diffusion plate 246 communicating with the middle passage 242, disposed at the middle of the water treatment region 226 of the housing 210, and having air diffusion holes 247 to spray air, and an auxiliary air diffusion plate 248 communicating with the middle passage 242, disposed between each of the side air diffusion plates 244 and the middle air diffusion plate 246, and having air diffusion holes 249 to spray air.

Air, introduced into the air diffusion pipe 240, is sprayed to the hollow fiber membranes through the air diffusion holes 245, 247, and 249 of the side air diffusion plates 244, the middle air diffusion plate 246, and the auxiliary air diffusion plates 248 so that air can be uniformly sprayed to the bundle of hollow fiber membranes 212.

The side air diffusion plates 244 extend vertically along the side of the housing 210 in a state in which a predetermined gap is maintained between each of the side air diffusion plates 244 and the inner wall of the housing 210. The lower end of each of the side air diffusion plates 244 is connected to the middle passage 242 of the air diffusion pipe 240 in an open state, and the upper end of each of the side air diffusion plates 244 is exposed to above the fixing part 230 in a closed state. Consequently, air, introduced into the middle passage 242, enters above the fixing part 230 through the gap between the inner wall of the housing 210 and each of the side air diffusion plates 244, and is sprayed to the hollow fiber membranes through the air diffusion holes formed at each of the side air diffusion plates 244.

The auxiliary air diffusion plate 248 is disposed between each of the side air diffusion plates 244 and the middle air diffusion plate 246 to improve an air diffusion effect. With increasing of capacity of the module, the number of hollow fiber membranes 212 in each of the submodules 200 is increased, and therefore, packing density is also increased. In this case, there is formed a region which the supplied air cannot reach due to increased straight distance from the air diffusion pipe 240 to the inside of the module and resistance caused by the dense hollow fiber membranes. For this reason, the auxiliary air diffusion plate 248 is disposed at the region to prevent the reduction of the air diffusion effect and to minimize the increase of membrane contamination.

2-4. Discharge Port

When discharge of air introduced by the air diffusion is restricted by adjusting the opening and closing degree of the discharge port 410, pressure is generated in the housing 210 by the introduced air. In this case, the present module 100 can be used as an external pressure type module. When the discharge port 410 is completely opened, the housing 210 communicates with the outside, and therefore, the present module 100 can be used as an vacuum type module using negative pressure.

In this embodiment, the discharge port 410 is provided at the piping unit side of the housing. The upper end of the housing is configured to have a structure having an inclined plane 400 inclined downward from the piping unit side to the outer end side of the housing. The discharge port 410 serves to discharge air and, in addition, to discharge condensed water containing condensed contaminants. The discharge port 410 is connected to the water discharge pipe 340 extending to above the submodules 200 through the interior of the water collection pipe 330.

In this embodiment, the inclined plane 400 formed at the upper end of the housing 210 is provided to prevent contaminants from accumulating at the outer end of the housing when condensed water is discharged. The upper end structure of the housing 210 and the form and location of the discharge port 410 are not particularly restricted.

A general valve structure may be used as the structure to adjust the opening and closing degree of the discharge port 410 although the structure to adjust the opening and closing degree of the discharge port 410 is not particularly restricted.

The present hollow fiber membrane module produces filtered water according to a predetermined recovery rate with respect to the introduction amount of raw water. In operation, therefore, condensed water containing condensed contaminants, left in the housing 210, is discharged from the system according to the predetermined recovery rate. In this embodiment, the condensed water is discharged through the discharge port 410 formed at the upper part of the housing 210. That is, the water level in the housing 210 is adjusted so that the condensed water intermittently overflows into the discharge port 410 provided at the upper part of the housing 210. The condensed water, having overflowed through the discharge port 410, flows downward along the water discharge pipe 340 connected to the discharge port 410 and is then discharged from the system. Also, in a case in which the present hollow fiber membrane module is operated as an external pressure type module through adjustment of the opening and closing degree of the discharge port 410, it is necessary to discharge air supplied by air diffusion. The air supplied by air diffusion is also discharged through the discharge port 410.

2-5. Partition Wall

Figure 5:
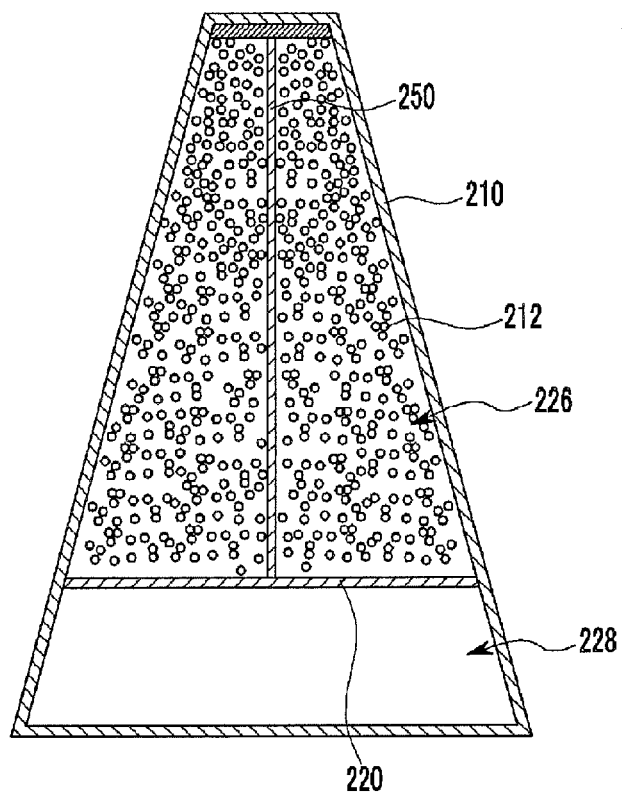
FIG. 5 is a schematic plan sectional view showing the interior of each submodule of the hollow fiber membrane module according to the first embodiment of the present invention.

As shown in FIG. 5, the partition wall 220 extends to the upper end of the housing 210 in a state in which the partition wall 220 slants toward the outer end of the housing 210.

In this embodiment, the partition wall 220 divides the interior of the housing 210 into two regions. The interior of the housing 210 is partitioned into the water treatment region 226, in which the hollow fiber membranes are disposed, and the raw water circulation passage 228 to circulate raw water to the water treatment region 226 by the partition wall 220.

The lower end of the partition wall 220 extends to the raw water passage 260 of the housing 210 so that the lower end of the partition wall 220 is connected to the raw water passage 260. Consequently, raw water, introduced into the raw water passage 260, is introduced into the raw water circulation passage 228 through a space defined between the partition wall 220 and the inside of the housing 210. The upper end hole 222 and the lower end hole 224 are formed at the upper end and the lower end of the partition wall 220, respectively. Consequently, raw water flows between the water treatment region 226 and the raw water circulation passage 228 only through the upper end hole 222 and the lower end hole 224.

The area of the raw water circulation passage 228 partitioned by the partition wall 220 may be ⅓ or more that of the water treatment region 226. If the area of the raw water circulation passage 228 is ⅓ or less that of the water treatment region 226, downward flow velocity of raw water is not sufficiently secured with the result that the raw water may fail to be properly circulated.

Also, the partition wall 220 is installed so as to protrude toward the water treatment region 226 from the fixing part 230 to fix the hollow fiber membranes. Consequently, the area of the water treatment region 226 surrounded by the partition wall 220 and the housing 210 is relatively less than that of the fixing part 230. This structure has an effect of increasing a filling rate of the hollow fiber membranes in the water treatment region 226. Consequently, it is possible to prevent falling of the upper ends of the free-end type hollow fiber membranes, the lower ends of which are fixed and the upper ends of which are free. The lower ends of the hollow fiber membranes are coated with the result that the lower ends of the hollow fiber membranes have a greater diameter than the remaining regions of the hollow fiber membranes. For this reason, the non-coated regions above the lower ends of the hollow fiber membranes may have a lower filling rate than the lower ends of the hollow fiber membranes, and therefore, the hollow fiber membranes in the non-coated regions may easily fall. In order to solve this problem, the partition wall 220 protrudes toward the water treatment region 226 to reduce the sectional area of the water treatment region 226 so that a filling density of the hollow fiber membranes in the non-coated regions is increased. As a result, it is possible to prevent falling of the hollow fiber membranes.

Meanwhile, as shown in FIG. 4, the present hollow fiber membrane module is configured to have a structure in which a middle partition wall 250 is further disposed vertically in the water treatment region 226 of the housing 210, in which the hollow fiber membranes 212 are disposed. In this embodiment, the middle partition wall 250 is vertically disposed above the middle air diffusion plate 246. Also, the middle partition wall 250 extends to the upper end of the housing 210.

The middle partition wall 250 divides the water treatment region 226, in which the hollow fiber membranes are disposed, to reduce the area of the water treatment region 226, in which the hollow fiber membranes are disposed, thereby increasing a filling rate of the hollow fiber membranes. That is, a vacant space of the upper part of the water treatment region 226 of the housing 210 is reduced by the middle partition wall 250 with the result that the packing density of the hollow fiber membranes is increased. In the present module, therefore, it is possible to further prevent falling of the hollow fiber membranes through the provision of the middle partition wall 250. Also, the middle partition wall 250 extends to above the middle air diffusion plate 246 to assist raw water introduced into the hollow fiber membranes and sprayed air to uniformly flow without concentration at one side.

The middle partition wall 250 may have a thickness equal to or greater than that of the middle air diffusion plate 246. In a case in which the thickness of the middle partition wall 250 is greater than that of the middle air diffusion plate 246, the middle partition wall 250 may have inclined planes at opposite sides or opposite edges of the lower end thereof so that air sprayed through the air diffusion holes of the middle air diffusion plate 246 is not accumulated at the lower end of the middle partition wall 250.

2-6. Raw Water Circulation Passage

The raw water circulation passage 228 formed in the housing 210 by the partition wall 220 serves as a passage along which raw water to be treated flows.

Figure 6:
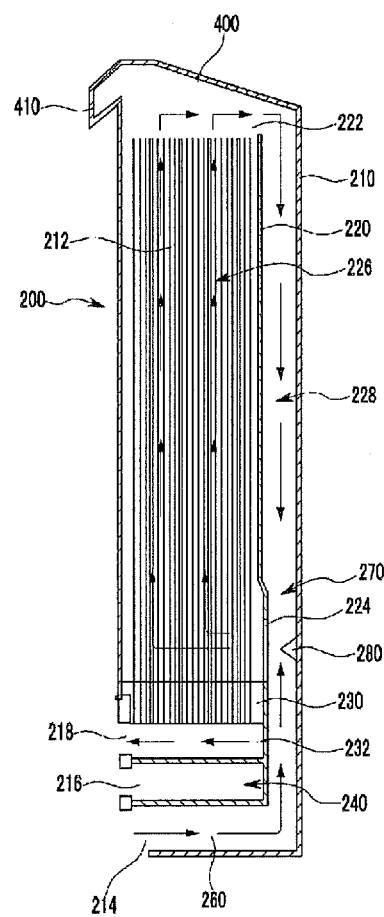
FIG. 6 is a schematic view illustrating a water treatment structure of the hollow fiber membrane module according to the first embodiment of the present invention.

As shown in FIG. 6, raw water, having moved upward through the water treatment region 226, in which the hollow fiber membranes are disposed, is introduced into the raw water circulation passage 228 through the upper end hole 222 formed at the upper end of the partition wall 220, and moves downward through the raw water circulation passage 228 between the partition wall 220 and the inner wall of the housing 210. Subsequently, the raw water is introduced into the water treatment region 226 through the lower end hole 224 formed at the lower end of the partition wall 220. In this way, the raw water is circulated.

In the present module, the raw water circulation passage 228 is formed by the partition wall 220, and therefore, it is possible to greatly increase flow velocity of raw water introduced into the hollow fiber membranes. This is because the flow velocity of raw water increased by air supplied from the air diffusion pipe 240 to the lower part of the water treatment region 226 forms a natural downward flow of a fluid outside when the raw water is discharged from the water treatment region 226. In the case of a general hollow fiber membrane module, downward flow velocity of a fluid naturally generated due to the structure of the module runs into flow velocity having different directions in the reaction vessel with the result that the flow velocity of the fluid is reduced. On the other hand, the present module includes the raw water circulation passage 228 partitioned by the partition wall 220, and raw water and circulated water are suctioned into the water treatment region 226 through the lower end hole 224 of the partition wall 220. Consequently, downward flow velocity generated at the upper end of the housing 210 is introduced into the water treatment region 226, and therefore, the downward flow velocity is maintained. This induces flow velocity higher than that in the housing 210 of each of the submodules 200.

The flow of the raw water is guided from the raw water circulation passage 228 to the lower end hole 224 of the partition wall 220, and therefore, it is possible to more smoothly maintain circulation of the raw water.

To this end, the housing 210 is provided at the inside thereof with a guide plate 280 which protrudes to guide the flow of raw water to the hole formed at the lower end of the partition wall 220.

As shown in FIG. 2, the guide plate 280 is disposed at the portion at which raw water moving downward through the raw water circulation passage 228 and raw water moving upward through the raw water circulation passage 228 run into each other to guide the flow of a fluid to the lower end hole 224 of the partition wall 220.

In this embodiment, the guide plate 280 is formed at the inside of the housing 210 so as to have a triangular sectional structure such that the guide plate 280 protrudes to the lower end hole 224 of the partition wall 220. Consequently, the flow of raw water introduced upward and downward through the raw water circulation passage 228 is changed in a state in which the reduction in flow velocity of the raw water is minimized by the guide plate 280, and the raw water flows into the water treatment region 226 through the lower end hole 224 of the partition wall 220. As a result, it is possible to more smoothly circulate raw water in the housing 210 without offset of flow velocity between upwardly moving raw water and downwardly moving raw water.

Figure 7:
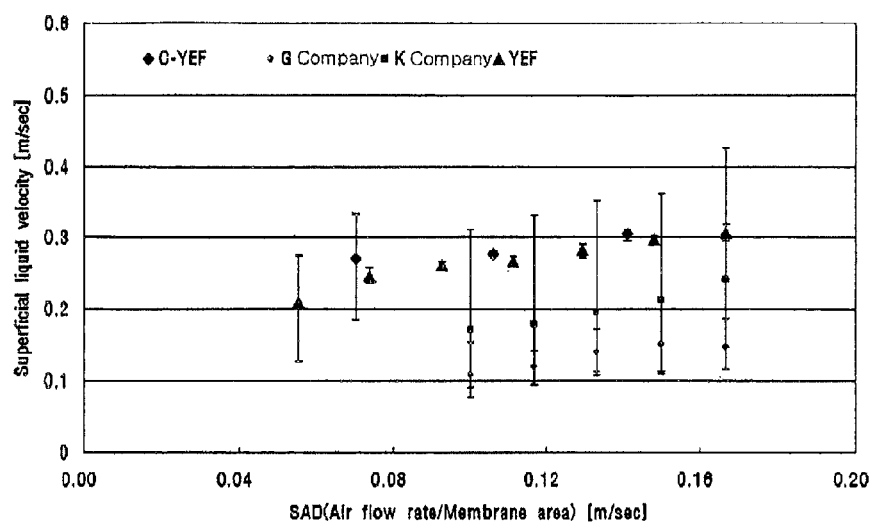
FIG. 7 is a graph showing comparison of flow velocity of raw water between the module according to the first embodiment of the present invention and a conventional module.
Figure 8:
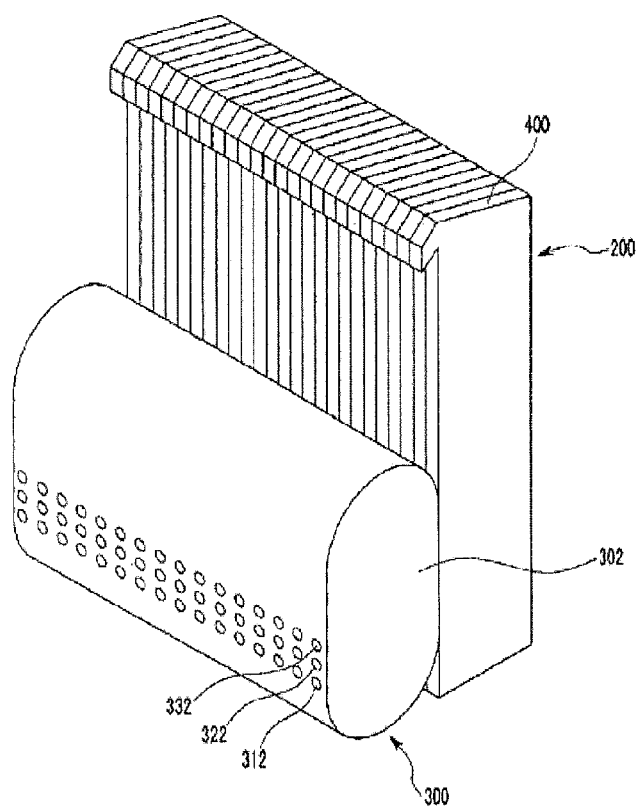
FIG. 8 is a perspective view showing a hollow fiber membrane module according to a second embodiment of the present invention.

FIG. 7 is a graph showing comparison in flow velocity of raw water between the module according to this embodiment and a conventional module.

In the graph of FIG. 7, air flow rate/membrane area (SAD) of an X axis is a value obtained by dividing an air flow rate by the area of the hollow fiber membrane module, and a Y axis indicates a value obtained by measuring upward flow velocity of a fluid at the upper part of the module.

In the graph, each point indicates an average value of flow velocities based on position, and an error bound indicates the maximum and minimum of a deviation generated by the difference between flow velocities based on position.

It can be seen from the graph of FIG. 7 that the present module (YEF and C-YEF) exhibits less difference between flow velocities based on position than a conventional module manufactured by G company and another conventional module manufactured by K company. High upward flow velocity of a fluid at low SAD means low energy consumption and excellent control of contamination. In this respect, the present module exhibits high flow velocity at low air flow rate as compared with the conventional modules, and therefore, it is possible to increase air diffusion efficiency, to reduce energy consumption, and to prevent unbalanced flow of a fluid due to scale-up.

The submodules 200 are mounted to the piping unit 300 to constitute the present hollow fiber membrane module 100, which is a large-sized module. Each of the submodules 200 is mounted to the piping unit 300 in a state in which the raw water inlet port 214, the air inlet port 216, and the outlet port 218, which are formed at the housing 210, are coupled to the raw water connection ports 312 of the raw water pipe 310, the air connection ports 322 of the air pipe 320, and the treated water connection ports 332 of the water collection pipe 330, respectively.

In this state, raw water, supplied through the raw water pipe 310, is introduced into the housing 210 of each of the submodules 300 through the raw water connection ports 312 and the raw water inlet port 214. The raw water, introduced through the raw water inlet port 214 of the housing 210, is introduced into the raw water circulation passage 228 connected to the raw water passage 260 via the raw water passage 260.

Subsequently, the raw water is introduced into the water treatment region 226, in which the hollow fiber membranes are disposed, from the raw water circulation passage 228 through the lower end hole 224 formed at the lower end of the partition wall 220. The raw water, introduced into the water treatment region 226, moves upward together with air sprayed from the air diffusion pipe 240, is introduced into the raw water circulation passage 228 through the upper end hole 222 formed at the upper end of the partition wall 220, and moves downward. The raw water is treated while the raw water is circulated as described above. Meanwhile, the raw water, introduced into the water treatment region 226, is filtered by the hollow fiber membranes 212. The raw water, filtered by the hollow fiber membranes, is collected by the collector 232 communicating with the internal passages of the hollow fiber membranes, is introduced into the water collection pipe 330 through the treated water connection ports 332 connected to the outlet port 218 of the collector 232, and is discharged.

During the above-described treatment process, yield is intermittently adjusted according to a recovery rate, and therefore, condensed water overflows through the discharge port 410 provided at the upper part of the housing 210 so that the condensed water is discharged. The condensed water is discharged through the water discharge pipe 340 in gross.

Second Embodiment

FIGS. 8 to 11 show another embodiment of the present module.

Referring to these drawings, the hollow fiber membrane module according to this embodiment includes a plurality of independent submodules 200 in which raw water is circulated and water treatment is carried out, a piping unit 300 through which raw water, air, treated water, and condensed water flow, the submodules 200 being mounted to the piping unit 300, a discharge port 410, through which air and condensed water are discharged, formed at the upper part of each of the submodules 200, an opening and closing degree of the discharge port 410 being adjusted. The hollow fiber membrane module according to this embodiment can also be driven as an vacuum type module or an external pressure type module depending upon a degree to which each of the submodules is hermetically sealed by a corresponding discharge port 410.

Hereinafter, a structure in which each of the submodules is operated as an external pressure type submodule by adjusting the opening and closing degree of the discharge port 410 provided at the upper part of each of the submodules 200 will be described as an example.

In this embodiment, the piping unit 300 extends in a straight line, and the submodules 200 are successively disposed in the longitudinal direction of the piping unit 300.

The piping unit 300 includes a raw water pipe 310 to supply raw water, an air pipe 320 to supply air, and a water collection pipe 330 to discharge water treated by the submodules 200.

The raw water pipe 310, the air pipe 320, and the water collection pipe 330 are disposed in parallel. The disposition and form of the raw water pipe 310, the air pipe 320, and the water collection pipe 330 are not particularly restricted.

In this embodiment, the water collection pipe 330, the air pipe 320, and the raw water pipe 310 are sequentially partitioned in a single body 302 in the downward direction to constitute a piping line.

At opposite sides of the body 203 are formed treated water connection ports 332 connected to the water collection pipe 330, air connection ports 322 connected to the air pipe 320, and raw water connection ports 312 connected to the raw water pipe 310 such that the treated water connection ports 332, the air connection ports 322, and the raw water connection ports 312 are disposed in pairs at corresponding positions at intervals. In addition, the pairs of treated water connection ports 332, air connection ports 322, and raw water connection ports 312 are successively formed at intervals in the longitudinal direction of the body such that the submodules 200 can be successively connected to the treated water connection ports 332, the air connection ports 322, and the raw water connection ports 312.

Also, the piping unit 300 further includes a water discharge pipe 340 to treat condensed water discharged through the discharge port 410 formed at the upper part of a housing 210. In this embodiment, the water discharge pipe 340 is provided separately from the body and is connected to the discharge port 410 at the upper part of each of the submodules 200.

Reference numeral 350 indicates an air injection pipe 350 connected to the water collection pipe 330. Upon performing a PDT of hollow fiber membranes, air is forcibly injected through the air injection pipe 350.

Figure 9:
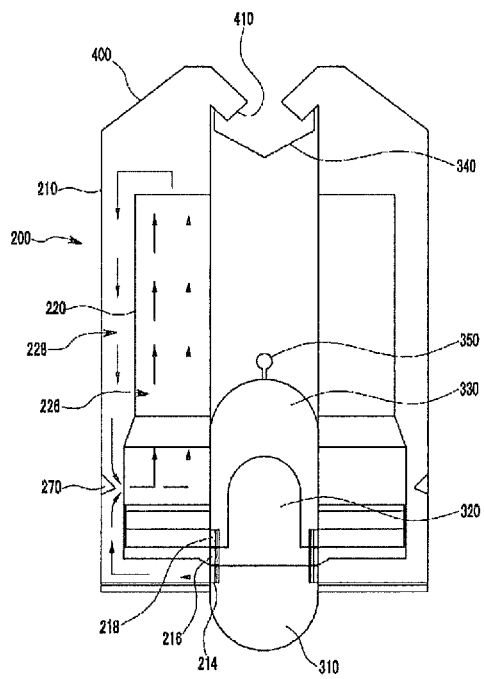
FIG. 9 is a schematic side sectional view showing the hollow fiber membrane module according to the second embodiment of the present invention.
Figure 10:
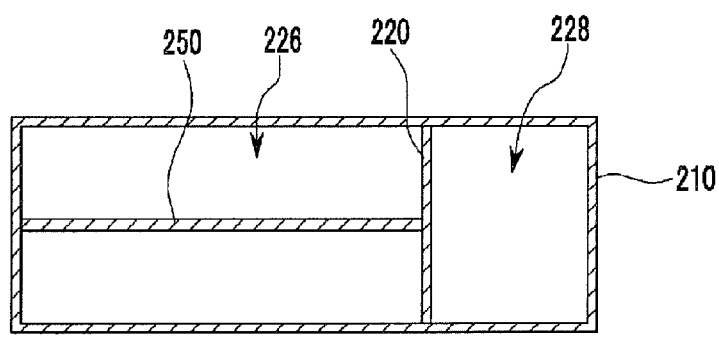
FIG. 10 is a schematic plan sectional view showing the interior of each submodule of the hollow fiber membrane module according to the second embodiment of the present invention.
Figure 11:
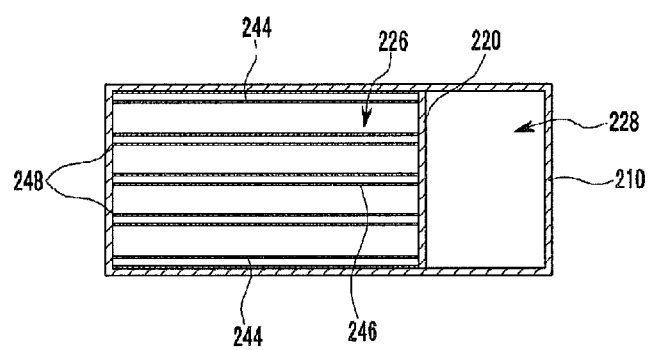
FIG. 11 is a schematic view showing an air diffusion structure of the hollow fiber membrane module according to the second embodiment of the present invention.

Meanwhile, the submodules 200 are mounted along opposite sides of the piping unit 300. In this embodiment, a housing 210 constituting each of the submodules 200 has a rectangular section as shown in FIG. 9.

The housing 210 is provided at one side of the lower end thereof with a raw water inlet port 214, through which raw water is introduced, an air inlet port 216, through which air is introduced, and an outlet port 218, through which treated water is discharged. Also, the discharge port 410, an opening and closing degree of which can be adjusted to configure each of the submodules 200 as an external pressure type submodule, is provided at the upper part of the housing 210.

The outlet port 218, the air inlet port 216, and the raw water inlet port 214 are sequentially formed at the housing 210 in the downward direction. The outlet port 218, the air inlet port 216, and the raw water inlet port 214 are connected to the treated water connection ports 332, the air connection ports 322, and the raw water connection ports 312 of the piping unit 300, respectively, so that treated water, air, and raw water can flow between the housing 210 and the piping unit 300.

In the hollow fiber membrane module according to this embodiment, a partition wall 220 and a middle partition wall 250 are provided in the housing 210 to circulate raw water and to prevent falling of the hollow fiber membranes. Also, an auxiliary air diffusion plate 248 is disposed between each side air diffusion plate 244 and a middle air diffusion plate 246 to improve air diffusion efficiency. This structure is identical to that as described above, and therefore, a detailed description thereof will be omitted.

The present module includes the straight piping unit 300, thereby having advantages in that it is possible to more easily extend the submodules 200 than the piping unit 200 of the first embodiment and to manufacture the submodules 200 so that each of the submodules 200 has a rectangular section, whereby the submodules 200 can be easily manufactured.

Third Embodiment

Figure 12:
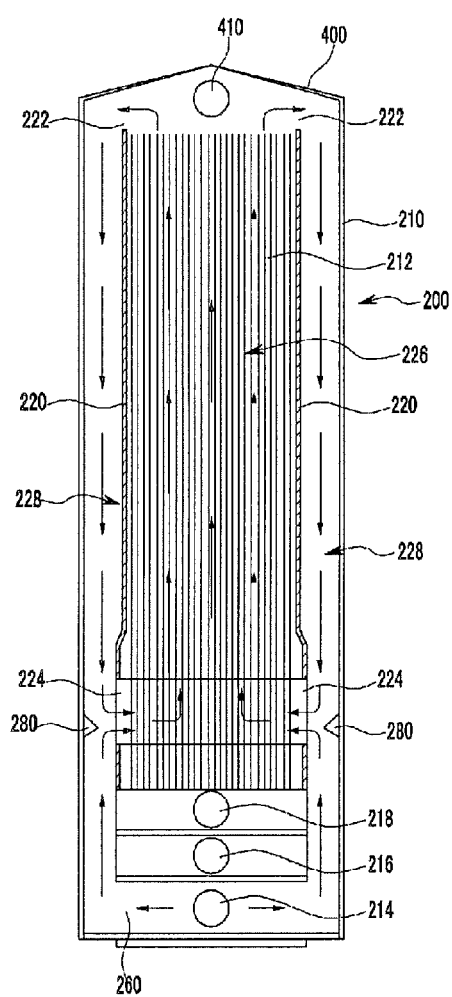
FIG. 12 is a side sectional view showing the structure of each submodule of a hollow fiber membrane module according to a third embodiment of the present invention.

FIG. 12 shows a structure in which raw water is circulated to opposite sides of a housing 210 as another embodiment of each of the submodules 200.

As shown, each of the submodules 200 according to this embodiment includes a housing 210, which forms the external appearance thereof and in which the hollow fiber membranes are disposed. The housing 210 is provided at one side thereof with a raw water inlet port 214, through which raw water is introduced, an air inlet port 216, through which air is introduced, and an outlet port 218, through which treated water is discharged.

Figure 13:
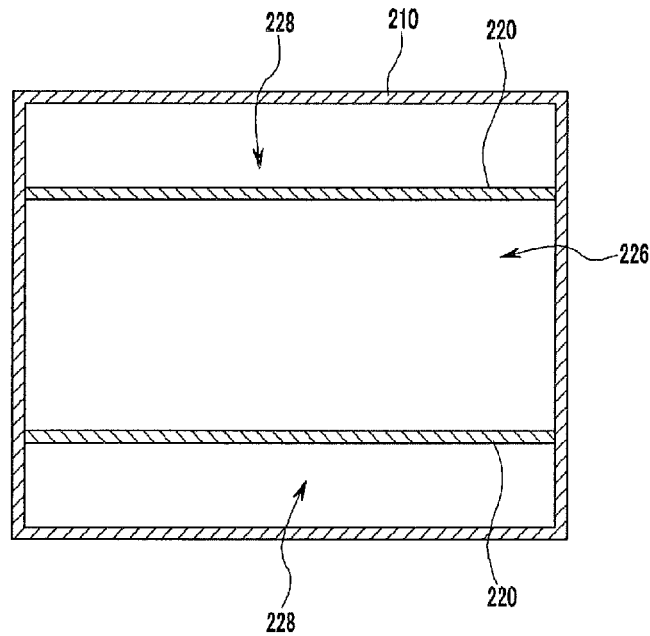
FIGS. 13 and 14 are schematic views showing the interior of each submodule of the hollow fiber membrane module according to the third embodiment of the present invention.

In the housing 210 are vertically installed partition walls 220 to partition the interior of the housing 210 into a water treatment region 226 and raw water circulation passages 228. In this embodiment, two partition walls 220 are disposed at opposite sides of the housing 210 as shown in FIG. 13.

An upper end hole 222, through which raw water flows, and a lower end hole 224, through which raw water flows, are formed at the upper end and the lower end of each of the partition walls 220, respectively. Consequently, regions between the respective partition walls 220 and the inside of the housing 210 constitute the raw water circulation passages 228, and a region between the partition walls 220 constitutes the water treatment region 226, in which the hollow fiber membranes, at which water treatment due to pressure difference is carried out, are disposed.

At the lower part of the housing 210 is formed a raw water passage 260 communicating with the raw water inlet port 214 and connected to the raw water circulation passages 228 to supply raw water. The raw water passage 260 is a predetermined space provided at the lowermost end of the housing 210. The raw water passage 260 communicates with the lower ends of the raw water circulation passages 228 along opposite side walls of the housing 210.

Consequently, raw water, introduced into each of the submodules 200, advances from the raw water passage 260 to the opposite sides of the housing 210, is introduced into the raw water circulation passages 228 disposed at the opposite sides of the housing 210, and is circulated into the water treatment region 226 located at the middle of the housing 210 through the upper end hole 222 and the lower end hole 224 formed at each of the partition walls 220.

In the present hollow fiber membrane module, a middle partition wall may further be vertically installed in the water treatment region 226 of the housing 210.

In each of the submodules 200 as described above, the partition walls 220 are disposed at the opposite sides of the housing 210 so that raw water can be circulated in a bidirectional fashion.

Figure 14:
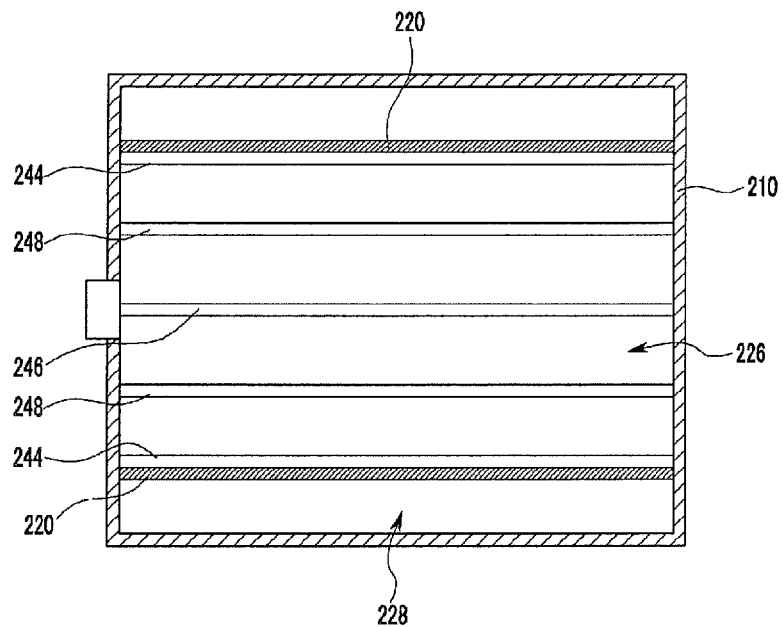

In this structure, an air diffusion pipe 240 is configured as shown in FIG. 14. The raw water circulation passages 228 are disposed at the opposite sides of the housing 210, and side air diffusion plates 244 and a middle air diffusion plate 246 are disposed in the water treatment region 226. Also, an auxiliary air diffusion plate 248 is disposed between each of the side air diffusion plates 244 and the middle air diffusion plate 246 to improve an air diffusion effect.

Each of the submodules 200 according to this embodiment is identical in construction to that previously described except for the structure of the partition walls 220 and the raw water circulation structure based thereon, and a detailed description thereof will be omitted.

In the present module, raw water is circulated at the opposite sides of the housing 210 in a bidirectional fashion, thereby further improving circulation efficiency.

Fourth Embodiment

Figure 15:
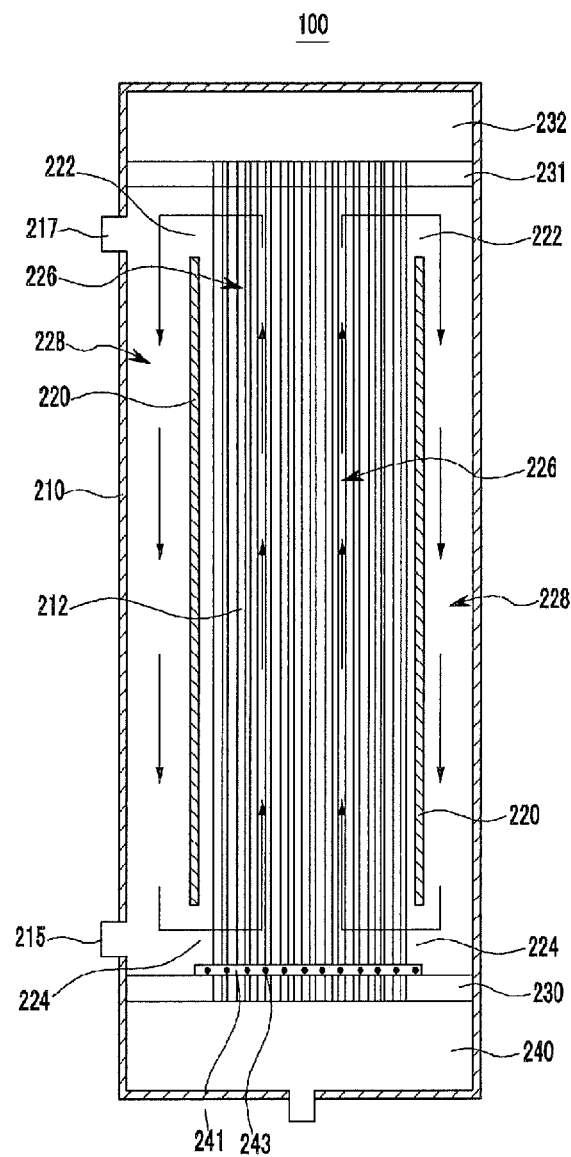
FIGS. 15 to 17 are schematic sectional views showing a hollow fiber membrane module according to a fourth embodiment of the present invention.

FIG. 15 shows a structure in which raw water is circulated by a partition wall 220 in a module in which opposite ends of hollow fiber membranes are fixed as another embodiment.

Referring to this drawing, the present module 100 includes a housing 210, the interior of which is hermetically sealed and which has a raw water inlet port 215 and a condensed water discharge port 217 respectively formed at the upper part and lower part of the side thereof, and hollow fiber membranes 212, opposite ends of which are fixed in the housing and which treat water. The lower end of each of the hollow fiber membranes is fixed to the lower end of the housing 210 by a fixing part 230. At the lower end of the fixing part 230 is provided an air diffusion pipe 240 to spray air bubbles to the hollow fiber membranes 212 through air diffusion holes 243 of an air diffusion plate 241 extending to above the fixing part 230. Also, the upper end of each of the hollow fiber membranes 212 is fixed to the upper end of the housing 210 by a fixing part 231, and a collector 232 provided at the upper end of the fixing part 231 communicates with the interiors of the hollow fiber membranes 212 to collect treated water.

In the present module, the partition wall 220, which partitions the interior of the housing 210 having the above-described structure into a water treatment region 226, in which the hollow fiber membranes 212 are disposed, and a raw water circulation passage 228, is vertically installed in the housing 210.

Figure 16:
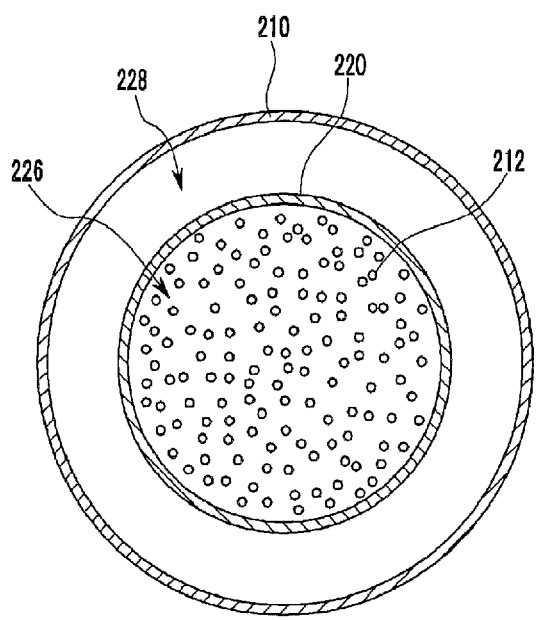

As shown in FIG. 16, the partition wall 220 surrounds the hollow fiber membranes 212, which are disposed in the center of the housing 210. At the upper end and the lower end of the partition wall 220 are formed an upper end hole 222 and a lower end hole 224, respectively, through which raw water flows. Consequently, raw water is introduced into the water treatment region from the raw water circulation passage 228 through the lower end hole 224 of the partition wall 220, and then moves upward. Subsequently, the raw water is introduced into the raw water circulation passage 228 from the water treatment region through the upper end hole 222 of the partition wall 220. In this way, the raw water is continuously circulated.

Figure 17:
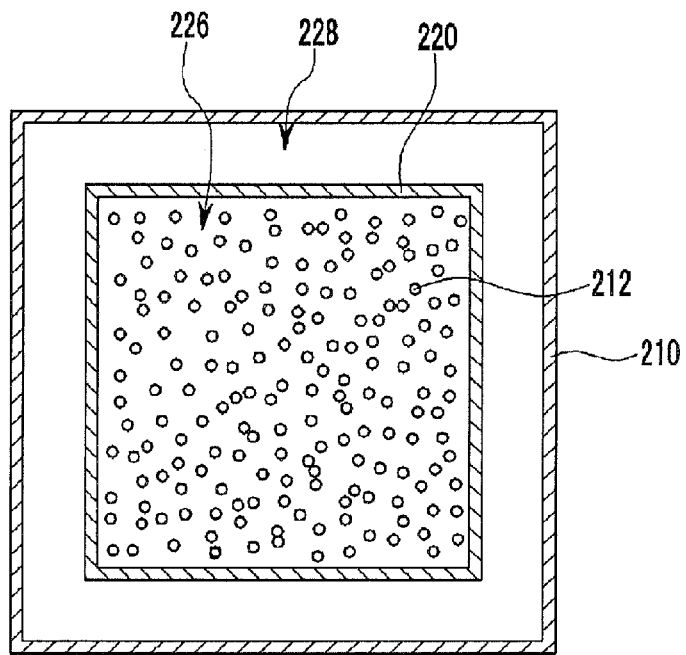

The housing 210 of the present module may have a circular sectional structure as shown in FIG. 16 or a quadrangular sectional structure as shown in FIG. 17 although the shape of the housing 210 is not particularly restricted. Even in the module configured to have a structure in which the opposite ends of each of the hollow fiber membranes 212 are fixed as described above, the raw water circulation passage 228 is formed in the housing 210 by the partition wall 220, and therefore, it is possible to greatly increase flow velocity of raw water introduced into the hollow fiber membranes. This is because the flow velocity of raw water increased by air supplied from the air diffusion pipe 240 to the lower part of the water treatment region 226 forms natural downward flow of a fluid outside when the raw water is discharged from the water treatment region 226. The present module includes the raw water circulation passage 228 partitioned by the partition wall 220, and raw water and circulated water are suctioned into the water treatment region 226 through the lower end hole 224 of the partition wall 220. Consequently, downward flow velocity generated at the upper end of the housing 210 is introduced into the water treatment region 226, and therefore, the downward flow velocity is maintained. This induces flow velocity higher than that in the housing 210 of each of the submodules 200. In this embodiment, the collector 232 is located at the upper end of the housing 210 to constitute an upper water collection structure; however, the same partition wall may be installed even in the case of a lower water collection structure or an upper and lower water collection structure to increase circulation flow velocity of raw water.

Fifth Embodiment

Figure 18:
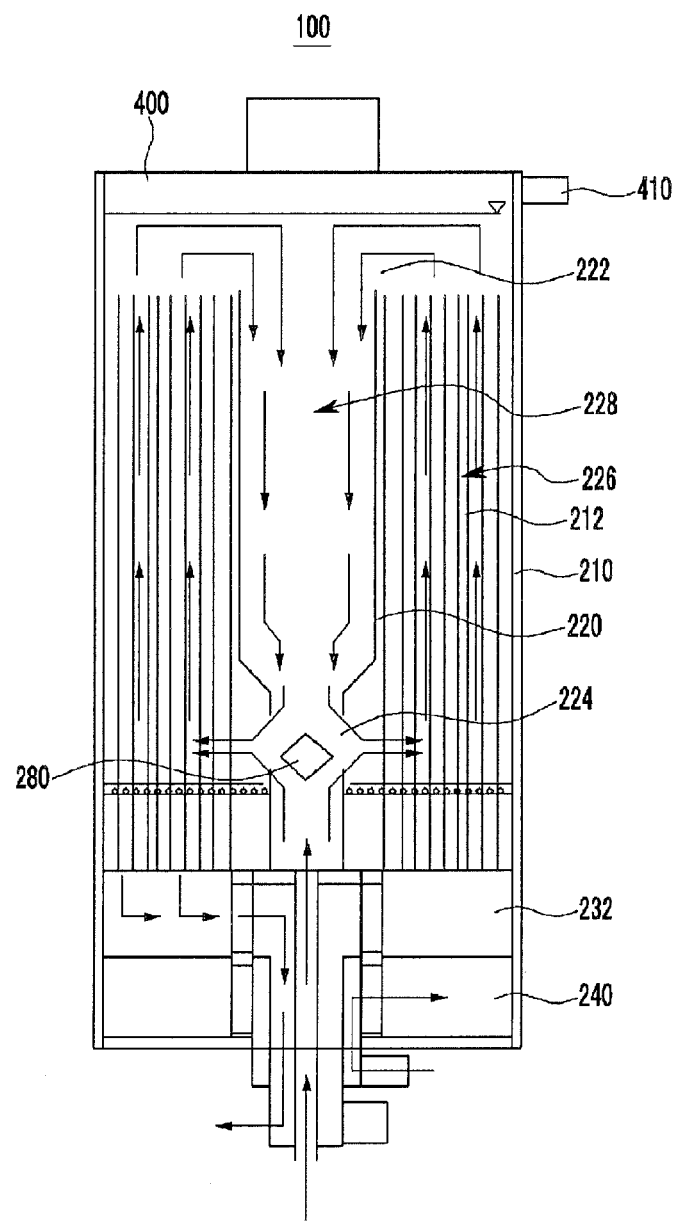
FIGS. 18 to 20 are schematic sectional views showing a hollow fiber membrane module according to a fifth embodiment of the present invention.

FIG. 18 shows a structure in which raw water is circulated by a partition wall 220 in a large-capacity module as a further embodiment of the present module.

Referring to this drawing, the present module 100 includes a large-capacity housing 210, which forms the external appearance thereof and in which raw water is circulated.

Hollow fiber membranes 212 are provided in the housing 210. The housing 210 is provided at the lower end thereof with a collector 232 to collect treated water and an air diffusion pipe 240. The present module 100 is driven as an vacuum type module or an external pressure type module depending upon a degree to which the housing is hermetically sealed by a discharge port 410.

In the middle of the housing 210 is installed a partition wall 220 to partition the interior of the housing 210 into a water treatment region 226, in which hollow fiber membranes are disposed, and a raw water circulation passage 228, in which raw water is circulated. At the upper end and the lower end of the partition wall 220 are formed an upper end hole 222 and a lower end hole 224, respectively, through which raw water flows.

In this embodiment, the middle of the housing 210 constitutes the raw water circulation passage 228, in which raw water is circulated, and a space defined between the inner wall of the housing 210 and the partition wall 220 constitutes the water treatment region 226, in which the hollow fiber membranes are disposed.

Figure 19:
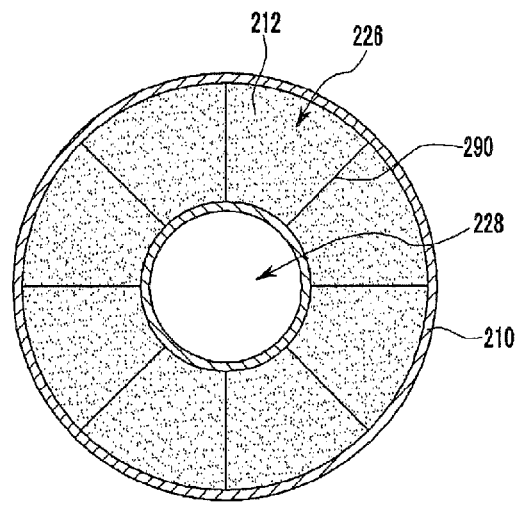

The partition wall 220 is configured to have a cylindrical structure as shown in FIG. 19. The partition wall 220 is disposed at the middle of the housing 210. Between the inner wall of the housing 210 and the partition wall 220 may be disposed a plurality of separation walls 290 arranged at intervals to partition the water treatment region 226 into a plurality of regions so as to prevent falling of the hollow fiber membranes. The number of separation walls may be changed based on the size of the housing 210, and the number of separation walls is not particularly restricted.

Reference numeral 280 indicates a guide plate to guide raw water to the lower end hole 224 of the partition wall 220.

Consequently, raw water is introduced into the water treatment region from the raw water circulation passage 228 through the lower end hole 224 of the partition wall 220, and then moves upward. Subsequently, the raw water is introduced into the raw water circulation passage 228 from the water treatment region through the upper end hole 222 of the partition wall 220. In this way, the raw water is continuously circulated.

Figure 20:
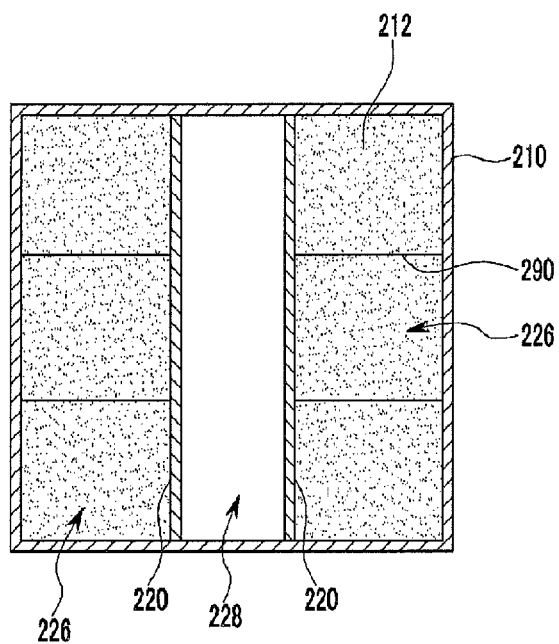

The housing 210 of the present module may have a circular sectional structure as shown in FIG. 19 or a quadrangular sectional structure as shown in FIG. 20 although the shape of the housing 210 is not particularly restricted. In the case of the structure shown in FIG. 20, a raw water circulation passage 228 is formed at the middle of the housing 210 by a partition wall 220, and water treatment regions 226, in which hollow fiber membranes are disposed, are formed at opposite sides of the housing 210. An appropriate number of separation walls 290 is disposed between the inner wall of the housing 210 and the partition wall 220 according to the size of each of the water treatment regions 226.

Even in a structure in which the module 100 is not constituted by coupling a plurality of submodules 200 but by a single large-capacity housing 210 as described above, the inner partition wall 220 is installed in the housing 210 to form the raw water circulation passage 228, through which raw water is circulated, thereby greatly increasing flow velocity of raw water introduced into the hollow fiber membranes 212.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A hollow fiber membrane module comprising:
a plurality of submodules in which raw water is circulated and water treatment is carried out, each submodule extending between a proximal end and a distal end;
a piping unit connected to the submodules at the proximal end, the piping unit having multiple pipes for independently transporting the raw water, air, and treated water; and
a discharge port provided at a distal end of the submodules in communication with the air;
wherein an interior of each submodule is partitioned to a water treatment region in which water treatment is carried out using a hollow fiber membrane, and a raw water circulation passage which circulates raw water to the water treatment region;
wherein in the water treatment region, the raw water is treated during upward movement by air supplied from a diffusion pipe which is disposed in outside of the water treatment region;
wherein each submodule comprises:
a housing provided at one side thereof with a raw water inlet port through which raw water is introduced, an air inlet port through which air is introduced, and an outlet port through which treated water is discharged;
at least one partition wall installed in the housing to partition an interior of the housing into the water treatment region and the raw water circulation passage, the at least one partition wall being provided at opposite ends thereof with holes through which raw water flows;
a fixing part to couple the hollow fiber membrane to the housing;
a collector in communication with the outlet port and an internal passage of the hollow fiber membrane to collect treated water having passed through the hollow fiber membrane; and
an air diffusion pipe in communication with the air inlet port of the housing to spray air bubbles to the hollow fiber membrane; and
wherein the treated raw water is introduced into the upper part of the raw water circulation passage through an upper end hole, and the flow velocity of the treated raw water is increased during downward movement through the raw water circulation passage, and the treated raw water is circulated to the water treatment region through a lower end hole, repeatedly.

2. The hollow fiber membrane module according to claim 1, wherein the partition wall is installed at one end of the housing so that the raw water circulation passage is formed at the one end of the housing.

3. The hollow fiber membrane module according to claim 1, wherein the partition wall is installed at each end of the housing so that the raw water circulation passage is formed at each end of the housing.

4. The hollow fiber membrane module according to claim 1, wherein the partition wall is installed so as to surround a central part of the housing.

5. The hollow fiber membrane module according to claim 1, wherein the housing is provided at an inside thereof with a guide plate protruding toward the hole formed at the lower end of the partition wall to guide raw water to the water treatment region through the hole.

6. The hollow fiber membrane module according to claim 1, wherein an area of the raw water circulation passage partitioned by the partition wall is 1/3 or more that of the water treatment region.

7. The hollow fiber membrane module according to claim 1, wherein the housing further comprises a middle partition wall installed in the water treatment region between the partition wall and an inner wall of the housing such that the middle partition wall extends in a longitudinal direction of the hollow fiber membrane.

8. The hollow fiber membrane module according to claim 1, wherein the air diffusion pipe comprises:
a middle passage formed in the housing and communicating with the air inlet port;
a side air diffusion plate communicating with the middle passage, installed along an inside of the water treatment region of the housing, and having an air diffusion hole to spray air;
a middle air diffusion plate communicating with the middle passage, disposed at a middle of the water treatment region of the housing, and having an air diffusion hole to spray air; and
an auxiliary air diffusion plate communicating with the middle passage, disposed between the side air diffusion plate and the middle air diffusion plate, and having an air diffusion hole to spray air.

9. The hollow fiber membrane module according to claim 1, wherein the piping unit comprises:
a raw water pipe having a raw water connection port, through which raw water is supplied, formed at a side thereof, the raw water pipe being connected to the raw water inlet port of the submodule;
an air pipe having an air connection port, through which air is supplied, formed at a side thereof, the air pipe being connected to the air inlet port of the submodule; and
a water collection pipe having a treated water connection port, through which treated water is introduced, formed at a side thereof, the water collection pipe being connected to the outlet port of the submodule.

10. The hollow fiber membrane module according to claim 9, wherein the piping unit further comprises a water discharge pipe, through which condensed water is discharged from the submodule.

11. The hollow fiber membrane module according to claim 10, wherein the submodule is further provided at the upper part thereof with a discharge port, through which condensed water containing condensed contaminants or air is discharged, and the discharge port is connected to the water discharge pipe.

12. The hollow fiber membrane module according to claim 9, wherein the submodule comprises a plurality of submodules disposed along an outer circumference of the piping unit.

13. The hollow fiber membrane module according to claim 12, wherein the piping unit is configured to have a multiple pipe structure in which the air pipe is disposed in the raw water pipe and the water collection pipe is disposed in the air pipe.

14. The hollow fiber membrane module according to claim 11, wherein the piping unit is configured to have a multiple pipe structure in which the air pipe is disposed in the raw water pipe, the water collection pipe is disposed in the air pipe, and the water discharge pipe is disposed in the water collection pipe.

15. The hollow fiber membrane module according to claim 13, wherein the raw water connection port is formed at an upper end of the raw water pipe of the piping unit along an outer circumference thereof, the air connection port is formed at an upper end of the air pipe, extending to the upper end of the raw water pipe, along an outer circumference thereof, and the treated water connection port is formed at an upper end of the water collection pipe, extending to the upper end of the air pipe, along an outer circumference thereof, so that the submodules are installed along the outer circumference of the piping unit via the connection ports.

16. The hollow fiber membrane module according to claim 9, further comprising a module support installed outside the piping unit to support the submodule.

17. The hollow fiber membrane module according to claim 9, wherein the piping unit extends in a straight line, and the submodule comprises a plurality of submodules successively disposed in a longitudinal direction of the piping unit.

18. The hollow fiber membrane module according to claim 17, wherein the raw water pipe, the air pipe, and the water collection pipe of the piping unit are disposed in parallel at intervals, and raw water connection ports, air connection ports, and treated water connection ports are respectively formed at the raw water pipe, the air pipe, and the water collection pipe at intervals in longitudinal directions thereof, so that the submodules are connected to each other in the longitudinal direction of the piping unit via the connection ports.

19. The hollow fiber membrane module according to claim 1, wherein the piping unit includes a raw water pipe, an air pipe, and a water collection pipe disposed in parallel and nested within one another.

* * * * *